United States Patent
Tamura

(10) Patent No.: US 9,561,725 B2
(45) Date of Patent: Feb. 7, 2017

(54) INFORMATION PROVIDING DEVICE FOR VEHICLE

(71) Applicant: NIPPON SEIKI CO., LTD., Niigata (JP)

(72) Inventor: Shigeaki Tamura, Niigata (JP)

(73) Assignee: NIPPON SEIKI CO., LTD., Niigata (JP)

( * ) Notice: Subject to any disclaimer, the term of this patent is extended or adjusted under 35 U.S.C. 154(b) by 16 days.

(21) Appl. No.: 14/411,264

(22) PCT Filed: Jun. 5, 2013

(86) PCT No.: PCT/JP2013/065521
§ 371 (c)(1),
(2) Date: Dec. 24, 2014

(87) PCT Pub. No.: WO2014/002708
PCT Pub. Date: Jan. 3, 2014

(65) Prior Publication Data
US 2015/0251538 A1 Sep. 10, 2015

(30) Foreign Application Priority Data

Jun. 27, 2012 (JP) ................................ 2012-144522
Sep. 3, 2012 (JP) ................................ 2012-192853

(51) Int. Cl.
*B60K 37/00* (2006.01)
*B60K 35/00* (2006.01)
*G01C 21/36* (2006.01)

(52) U.S. Cl.
CPC ............... *B60K 37/00* (2013.01); *B60K 35/00* (2013.01); *G01C 21/3626* (2013.01); *B60K 2350/1056* (2013.01); *B60K 2350/20* (2013.01)

(58) Field of Classification Search
CPC .................. B60K 2350/1056; B60K 2350/20; B60K 35/00; B60K 37/00; G01C 21/3626
See application file for complete search history.

(56) References Cited

U.S. PATENT DOCUMENTS 6,261,650 B1 * 7/2001 Kobayashi ........... C09K 19/544
252/299.01
7,534,000 B1 * 5/2009 Adachi .................. B60K 35/00
362/23.01

(Continued)

FOREIGN PATENT DOCUMENTS

JP 2001-22482 A 1/2001
JP 2008-195393 A 8/2008

(Continued)

OTHER PUBLICATIONS

International Search Report issued in International Application No. PCT/JP2013/065521 dated Sep. 10, 2013, w/English translation.

*Primary Examiner* — Sisay Yacob
(74) *Attorney, Agent, or Firm* — McDermott Will & Emery LLP

(57) ABSTRACT

An information providing device for a vehicle, comprising an in-car device having a display unit for displaying vehicle state information and a first control means for activating the display unit; and an external device having a second control for outputting external information. The display unit has a first display area for displaying predetermined information, and a second display area for displaying other information. The first control implements a first display mode for displaying the vehicle state information and a second display mode for displaying the vehicle state information and the external information. In the second display mode, the first control means activates the display unit so that the external information is displayed in the second display area.

8 Claims, 8 Drawing Sheets

(56) References Cited

U.S. PATENT DOCUMENTS

| | | | | |
|---|---|---|---|---|
| 2002/0026281 A1* | 2/2002 | Shibata | .................. | G08G 1/123 |
| | | | | 701/29.1 |
| 2003/0035050 A1* | 2/2003 | Mizusawa | .............. | B60K 35/00 |
| | | | | 348/148 |
| 2005/0001714 A1* | 1/2005 | Amari | .................... | B60K 35/00 |
| | | | | 340/425.5 |
| 2005/0172230 A1* | 8/2005 | Burk | ..................... | G06F 3/0482 |
| | | | | 715/716 |
| 2007/0078598 A1* | 4/2007 | Watanabe | .............. | B60K 37/02 |
| | | | | 701/429 |
| 2008/0150709 A1* | 6/2008 | Yamamoto | ............. | B60K 35/00 |
| | | | | 340/441 |
| 2008/0197990 A1* | 8/2008 | Yamamoto | ............. | B60K 35/00 |
| | | | | 340/438 |

FOREIGN PATENT DOCUMENTS

| | | |
|---|---|---|
| JP | 2009-6950 A | 1/2009 |
| JP | 2010-78623 A | 4/2010 |
| JP | 2012-1074 A | 1/2012 |

\* cited by examiner (a)

(b)

(a)

(b)

(a)

(b)

(a)

(b)

INFORMATION PROVIDING DEVICE FOR VEHICLE

CROSS-REFERENCE TO RELATED APPLICATIONS

The present application is the U.S. National Phase of PCT/JP2013/065521 filed Jun. 5, 2013, which claims priority to Japanese Patent Application No. 2012-144522 filed Jun. 27, 2012 and Japanese Patent Application No. 2012-192853 filed Sep. 3, 2012. The disclosures of the above applications are incorporated herein by reference.

TECHNICAL FIELD

The present invention relates to an information providing device for a vehicle, which provides various information to a vehicle user. More particularly, the present invention relates to an information providing device for a vehicle, which provides various information using a vehicle-mounted device and an external device.

BACKGROUND ART

For example, an information providing device for a vehicle, such as an intra-vehicle information system, is disclosed in the following PTL 1. In this information providing device, a portable information device (external device) and a vehicle-mounted multimedia computer (vehicle-mounted device) having a liquid crystal display mounted on a vehicle are connected to each other and can be communicated with each other. Thereby, external information (an audio player, a navigation system and an internet browser) of a vehicle, which is held in the portable information device, can be displayed to a vehicle user through a display (display part) which is included in the vehicle-mounted multimedia computer.

CITATION LIST

Patent Literature

[PTL 1] JP-A-2001-22482

SUMMARY OF INVENTION

Technical Problem

In the information providing device disclosed in the above-described PTL 1, a vehicle user can easily use a portable information device in the vehicle and an intra-vehicle information system (information providing device for a vehicle) which is highly convenient for the vehicle user can be provided. However, in the case of presenting the external information (external information of a vehicle) held in the portable information device to the vehicle user by using an existing display rather than a dedicated display, there is room for improvements in the display layout of the external information.

Particularly, assuming that the existing display is an instrument display (display part) included in a vehicle instrument (vehicle-mounted device), vehicle state information such as a travelling speed of a vehicle is typically displayed on the instrument display. In order to further display the external information held in the portable information device on the instrument display having the vehicle state information displayed thereon, it is necessary to change the layout of various information to be displayed in the instrument display. Here, the various information includes the vehicle state information and the external information.

However, when the layout of the various information to be displayed in the instrument display is changed in this way, it is expected that confusion is caused (a sense of discomfort is given) to a vehicle user driving a vehicle while viewing the various information. This is not desirable from the viewpoint of Human/Machine Interface (HMI). For example, when the vehicle is a motorcycle, a space for mounting the dedicated display is limited from the structural aspects of the motorcycle. Accordingly, it is considered to use the existing display (instrument display).

Therefore, the present invention has been made in consideration of the above-described improvement and an object thereof is to provide an information providing device for a vehicle, which is capable of improving the human/machine interface by suppressing, to a necessary minimum amount, the movement of information displayed on a display part in the case of providing external information held in an external device to a vehicle user through the display part included in a vehicle-mounted device.

Solution to Problem

The present invention provides an information providing device for a vehicle, which includes a vehicle-mounted device including a display part for displaying various vehicle state information to a user and a first control means for activating the display part; and an external device connected to the vehicle-mounted device through a connection means and including a second control means for outputting external information of the vehicle to the first control means. The display part includes a first display area for displaying predetermined information of the vehicle state information and a second display area for displaying other vehicle state information different from the predetermined information. The first control means implements a first display mode where the vehicle state information is displayed on the display part and a second display mode where the vehicle state information and the external information of the vehicle are displayed on the display part. In the second display mode, the first control means activates the display part so that the external information of the vehicle is displayed on the second display area.

Further, the present invention provides an information providing device for a vehicle, which includes a vehicle-mounted device including a display part for displaying various vehicle state information to a user and a first control means for activating the display part; and an external device connected to the vehicle-mounted device through a connection means and including a second control means for outputting external information of the vehicle to the first control means. The first control means implements a process of switching a first display mode where the vehicle state information is displayed on the display part to a second display mode where the vehicle state information and the external information of the vehicle are displayed on the display part when receiving a signal indicating that the external device is connected to the vehicle-mounted device or an operation instruction signal outputted from an operation means that can be operated by the user. In the execution of the second display mode, the display part is provided with a vehicle information display area for displaying predetermined information of the vehicle state information and an external information display area for displaying the external information of the vehicle.

Further, the present invention provides an information providing device for a vehicle, which includes a vehicle-mounted device including a display part for displaying various vehicle state information to a user and a first control means for activating the display part; and an external device connected to the vehicle-mounted device through a connection means and including a second control means for outputting external information of the vehicle to the first control means. The first control means implements a process of switching a first display mode where the vehicle state information is displayed on the display part to a third display mode where the vehicle state information, the external information of the vehicle and operation information relating to an operation of the external device are displayed on the display part when receiving a signal indicating that the external device is connected to the vehicle-mounted device or an operation instruction signal outputted from an operation means that can be operated by the user. In the execution of the third display mode, the display part is provided with a vehicle information display area for displaying predetermined information of the vehicle state information, an external information display area for displaying the external information of the vehicle and an operation information display area for displaying the operation information.

Further, in the present invention, the first display area is configured as a fixed display area where the predetermined information can be displayed on a predetermined display position in the execution of the first and second display modes. The second display area is configured as a variable display area where the display format of the other information can be varied in conjunction with displaying of the external information of the vehicle in the execution of the second display mode.

Further, in the present invention, the first control means activates the display part so that the external information of the vehicle including operation information relating to an operation of the external device is displayed on the second display area in the execution of the second display mode.

Further, in the present invention, the vehicle state information includes caution evocating information for calling the attention of the user. The first control means has a function of determining whether or not the caution evocating information is generated in the execution of the second display mode. When it is determined that the caution evocating information is generated, the first control means activates the display part so that a portion of the external information of the vehicle displayed on the second display area is switched and displayed as the caution evocating information.

Further, in the present invention, the vehicle state information includes caution evocating information for calling the attention of the user. The first control means has a function of determining whether or not the caution evocating information is generated in the execution of the second display mode. When it is determined that the caution evocating information is generated, the first control means activates the display part so that a portion of the external information of the vehicle displayed on the external information display area is switched and displayed as the caution evocating information.

Further, in the present invention, the vehicle state information includes caution evocating information for calling the attention of the user. The first control means has a function of determining whether or not the caution evocating information is generated in the execution of the third display mode. When it is determined that the caution evocating information is generated, the first control means activates the display part so that a portion of the external information of the vehicle displayed on the external information display area or a portion of the operation information displayed on the operation information display area is switched and displayed as the caution evocating information.

Advantageous Effects of Invention

The present invention can provide an information providing device for a vehicle, which improves the human/machine interface by suppressing, to a necessary minimum amount, the movement of information displayed on a display part in the case of providing external information held in an external device to a vehicle user through the display part included in a vehicle-mounted device.

EMBODIMENT FOR CARRYING OUT INVENTION

First Embodiment

Hereinafter, a first embodiment of the present invention will be described with reference to FIG. 1 to FIG. 5.

Figure 1:
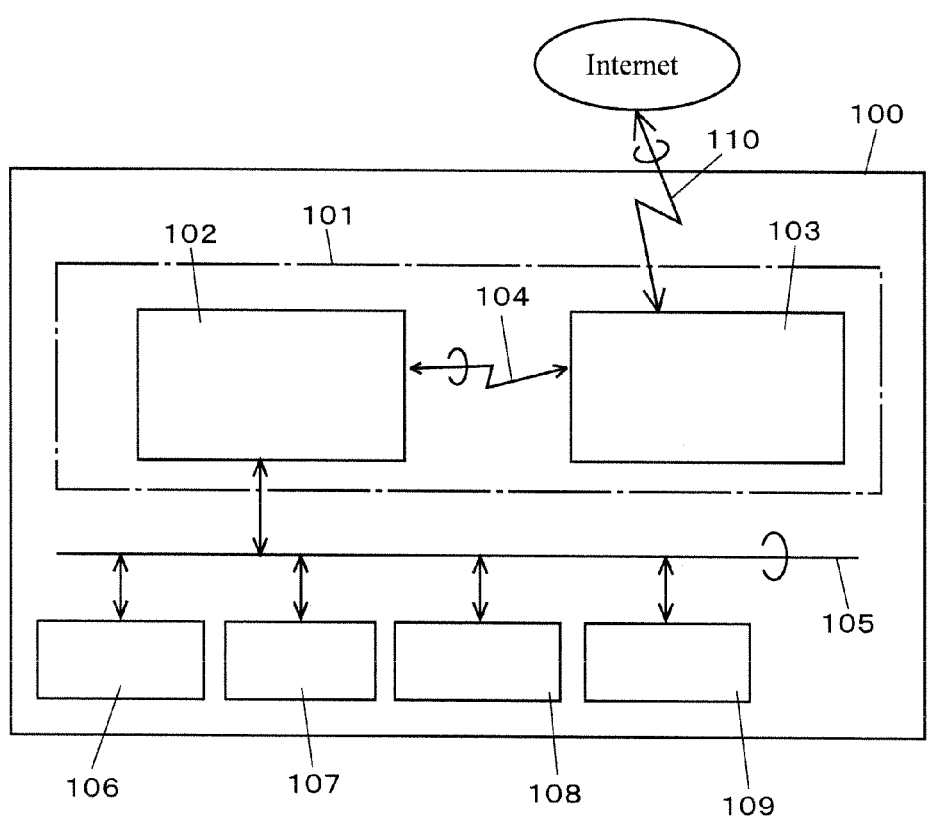
FIG. 1 is a block diagram showing a connection state of various electrical components and an information providing device for a vehicle according to a first embodiment of the present invention.

FIG. 1 is a block diagram showing an illustrative embodiment of the present invention. In FIG. 1, a reference numeral 100 indicates a vehicle. Further, a reference numeral 101 indicates an information providing device for the vehicle. The information providing device for the vehicle 101 is configured by a vehicle-mounted device (herein, a vehicle instrument) 102, an external device (herein, a smart phone) 103 that is a portable information device, and a connection means 104 for connecting the vehicle-mounted device 102 and the external device 103 to each other.

The vehicle-mounted device 102 is connected to electrical components such as an audio 106, an air conditioner 107, a body control unit 108 and an engine control unit 109 through an intra-vehicle LAN (multiplex communication line) 105. Further, the external device 103 is connected to the vehicle-mounted device 102 through the connection means 104. The external device 103 can be also connected to an internet through a communication means 110.

Figure 2:
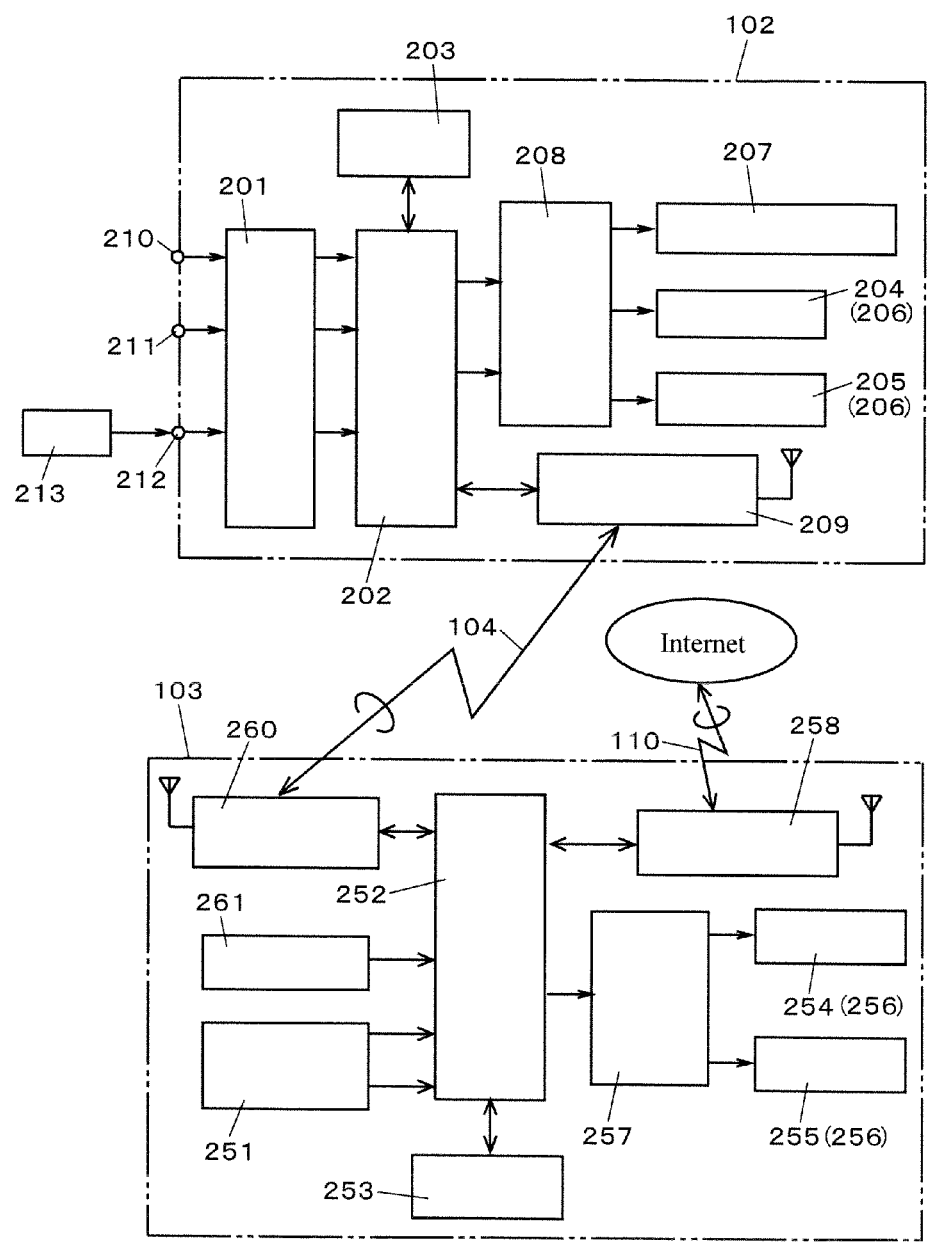
FIG. 2 is a block diagram of the information providing device for a vehicle according to the above embodiment.

Next, a configuration of the information providing device for the vehicle 101 mainly configured by the vehicle-mounted device 102 and the external device 103 will be described in detail with reference to FIG. 2. The vehicle-mounted device 102 includes a vehicle information terminal (vehicle information means) 210 and a multiplex communication input/output terminal (multiplex communication input/output means) 211, which input and output respective information (vehicle state signal) about various states of a vehicle, an operation information terminal 212 to which an operation instruction signal from a predetermined operation means 213 can be inputted, a vehicle interface (vehicle I/F) means 201, a first control means 202 which is configured by, e.g., a microcomputer for controlling the vehicle-mounted device 102, a first storage means 203 which is configured by a non-volatile memory such as EEPROM or flash memory for storing a process program of the first control means 202, a first notification means 206 which is configured by a first display part (display part) 204 such as a liquid crystal display panel or an organic EL panel for visually notifying various information (various states of a vehicle) to a vehicle user and a first sounding body 205 such as a speaker for acoustically notifying various information (various states of the vehicle) to the vehicle user, a first drive means 208 which drives and controls the first display part 204, the first sounding body 205 and various analog-type (needle-type) instruments 207, and a first communication unit (herein, Bluetooth (registered trademark)) 209 as a wireless communication means which constitutes the connection means 104 for connection with the external device 103.

Here, when the vehicle is a motorcycle, the first sounding body 205 may be a helmet speaker which is mounted to a helmet worn by a passenger (user) boarding on the motorcycle. Further, although details are not shown, the various analog-type instruments 207 include at least one of an analog speedometer indicating a speed of a vehicle, an analog tachometer indicating an engine speed of the vehicle, an analog fuel meter indicating an amount of fuel in a tank, and an analog thermometer indicating a temperature of engine cooling water.

Meanwhile, the first communication unit 209 is adapted to perform wireless communication with a second communication unit (to be described later) included in the external device 103. That is, the first communication unit 209 can exchange data with the second communication unit included in the external device 103.

Further, the operation means 213 is configured by an operation input unit for performing various operations of the vehicle-mounted device 102. For example, a substantially cross key type operation input unit may be employed which includes a cursor button or an enter button or the like provided at a proper position in the vehicle so as to allow access of a user's hand. As a user operates the operation means 213, an operation instruction signal (remote operation instruction signal) is outputted toward the external device 103 from the operation means 213. The operation instruction signal is inputted to the first control means 202 through the operation information terminal 212 and the vehicle interface means 201 and reaches the external device 103 through the connection means 104. Meanwhile, as the operation means 213, a touch panel type operation input unit may be employed in place of the cross key type operation input unit as described above.

The external device 103 includes a second communication unit (herein, Bluetooth (registered trademark)) 260 as a wireless communication means constituting the connecting means 104 for connection with the vehicle-mounted device 102, various sensors (herein, GPS module) 261, an interface (I/F) means 251, a second control means 252 which is configured by, e.g., a microcomputer for controlling the external device 103, a second storage means 253 which is configured by a non-volatile memory such as EEPROM or flash memory for storing a process program of the second control means 252, a second notification means 256 which is configured by a second display part 254 such as a display equipped with a touch panel for visually notifying various information (various states of a vehicle) to a vehicle user and a second sounding body 255 such as a speaker for acoustically notifying various information (various states of the vehicle) to the vehicle user, a second drive means 257 which drives and controls the second display part 254 and the second sounding body 255, and a communication module 258 constituting the communication means 110 for connection to an internet.

Meanwhile, in the present embodiment, as the connection means 104 of the vehicle-mounted device 102 and the external device 103, the first and second communication units 209, 260 configured by the wireless communication means are employed. However, the present invention is not limited thereto. The vehicle-mounted device 102 and the external device 103 may be connected to each other by using the connection means 104 configured by a wired connection means such as USB.

Further, in the present embodiment, the first communication unit 209 is provided in the vehicle-mounted device 102. However, the present invention is not limited thereto. For example, the vehicle-mounted device 102 and the external device 103 may be connected to each other by providing a gateway (G/W) means (not shown) connected to the intra-vehicle LAN 105 and incorporating the first communication unit 209 in the gateway means.

Next, by referring to FIG. 3 to FIG. 5, a display layout will be described which is displayed on the first display part 204 when the first control means 202 included in the vehicle-mounted device 102 implements first and second display modes (to be described later).

Figure 3:
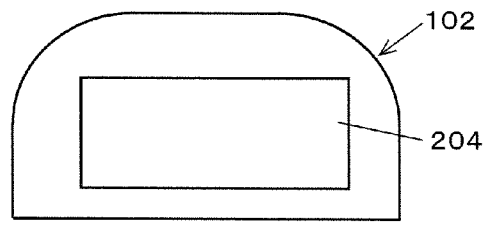
FIG. 3(a) is a schematic view showing an example of a vehicle-mounted device according to the above embodiment and FIG. 3(b) is a schematic view showing another example of the vehicle-mounted device according to the above embodiment.

Here, the vehicle-mounted device 102 that is a vehicle instrument includes the first display part 204 configured by the liquid crystal display panel, as shown in FIG. 3. The first display part 204 is configured by an instrument display which is adapted to display various states of a vehicle as vehicle state information to a vehicle user.

The first control means 202 receives the vehicle state signal through the multiplex communication input/output terminal 211 (or the vehicle information terminal 210). Then, based on the vehicle state signal, the first control means 202 implements a control for displaying and operating the first display part 204 in such a way that the vehicle state information corresponding to a first display mode M1 as shown in FIG. 4 is displayed on the first display part 204.

In the first display mode M1 where the external information (to be described later) of the vehicle is not displayed at all but only the vehicle state information is displayed on the first display part 204, the first control means 202 implements a control for displaying and operating the first display part 204 in such a way that a vehicle speed display portion 300 for displaying a travelling speed of a vehicle, a shift position display portion 310 for displaying a shift position, a fuel remaining amount display portion 320 for displaying the remaining amount of fuel, a direction indication display portion 330 for displaying a travelling direction of the vehicle, a fuel consumption display portion 340 for displaying the average fuel consumption of the vehicle, an outside temperature display portion 350 for displaying the temperature outside the vehicle and an alert display portion 360 are displayed as the vehicle state information on the first display part 204. Here, the alert display portion is caution evocating information.

Further, in the first display mode M1, the first display part 204 includes a first display area R1 and a second display area R2, which are divided from each other. The first display area R1 is located at an upper portion of the first display part 204. The first display area R1 displays the above-described vehicle speed display portion 300, the shift position display portion 310, the fuel remaining amount display portion 320 and the direction indication display portion 330, which are predetermined information D1 of the vehicle state information.

The vehicle speed display portion 300 is displayed on the center of the first display area R1. The shift position display portion 310 is located on the left side of the vehicle speed display portion 300 so as to be adjacent to the vehicle speed display portion 300. The fuel remaining amount display portion 320 is located on the right side of the vehicle speed display portion 300 so as to be adjacent to the vehicle speed display portion 300. The direction indication display portions 330 are located on both end sides of the first display area R1. The shift position display portion 310 and the fuel remaining amount display portion 320 are located between the direction indication display portions 330.

Further, in the present embodiment, the predetermined information D1 including the vehicle speed display portion 300, the shift position display portion 310, the fuel remaining amount display portion 320 and the direction indication display portion 330 refers to the vehicle state information which has high priority and is frequently viewed by a vehicle user. The first display mode M1 has a display layout where the predetermined information D1 is displayed on the first display area R1.

On the other hand, the second display area R2 is located at a lower portion of the first display part 204. The second display area R2 displays the fuel consumption display portion 340, the outside temperature display portion 350 and the alert display portion 360, which are other information D2 of the vehicle state information different from the predetermined information D1.

The fuel consumption display portion 340 and the outside temperature display portion 350 are displayed on the left side of the second display area R2 in a state of being vertically arranged. The outside temperature display portion 350 is displayed directly below the fuel consumption display portion 340.

Further, upon receiving various alert signals (herein, a trunk open signal indicating that a trunk on the rear of a vehicle is opened) through the multiplex communication input/output terminal 211 (or the vehicle information terminal 210), the first control means 202 causes the first display part 204 to be displayed and operated on the basis of the alert signals. In accordance with this operation, the alert display portion 360 referring to "trunk is opened" is displayed on the right side of the second display area R2 in the first display part 204. Thus, in this embodiment, as one of the vehicle state information, the alert display portion 360 is included as the caution evocating information for calling the attention of a vehicle user.

Further, in the present embodiment, the other information D2 including the fuel consumption display portion 340, the outside temperature display portion 350 and the alert display portion 360 refers to the vehicle state information which is less frequently viewed by a vehicle user. The first display mode M1 has a display layout where the other information D2 is displayed on the second display area R2. Meanwhile, in the second display area R2 when the first display mode M1 is implemented, the display area of a left region 400 where the fuel consumption display portion 340 and the outside temperature display portion 350 are displayed is substantially the same as the display area of a right region 410 where the alert display portion 360 is displayed.

Next, a display layout will be described which is displayed on the first display part 204 when the first control means 202 implements a second display mode M2 different from the first display mode M1.

In the execution of the second display mode M2, the first control means 202 receives the vehicle state signal through the multiplex communication input/output terminal 211 (or the vehicle information terminal 210). Simultaneously, the first control means 202 receives the external information (herein, navigation information) of a vehicle from the external device 103 via each of the communication units 260, 209. Based on the vehicle state signal or the navigation information, the first control means 202 implements a control for displaying and operating the first display part 204 in such a way that the display information corresponding to the second display mode M2 as shown in FIG. 5(a) is displayed on the first display part 204.

Specifically, in the second display mode M2, the second control means 252 included in the external device 103 outputs the navigation information to the first control means 202 through the connection means 104 (each of the communication units 260, 209). The first control means 202 implements a control for displaying and operating the first display part 204 in such a way that a navigation display portion 370 (the external information of the vehicle) is displayed on the second display area R2.

Accordingly, the display information corresponding to the second display mode M2 includes the vehicle speed display portion 300, the shift position display portion 310, the fuel remaining amount display portion 320, the direction indication display portion 330, the fuel consumption display portion 340 and the navigation display portion 370. Meanwhile, the external information of the vehicle may be incoming mail information, incoming call information, and music information, etc., other than the navigation display portion 370.

Then, among these, the predetermined information D1 including the vehicle speed display portion 300, the shift position display portion 310, the fuel remaining amount display portion 320 and the direction indication display portion 330 is displayed on the first display area R1, similar to the case of the first display mode M1. Further, each of the vehicle speed display portion 300, the shift position display portion 310, the fuel remaining amount display portion 320 and the direction indication display portion 330 in the second display mode M2 is displayed on the same position as in the first display mode M1.

Thus, in this embodiment, the first display area R1 is configured as a fixed display area where the predetermined information D1 including the vehicle speed display portion 300, the shift position display portion 310, the fuel remaining amount display portion 320 and the direction indication display portion 330 can be displayed on a predetermined display position in the execution of both display modes M1, M2.

Further, in the second display mode M2, the fuel consumption display portion 340 and the navigation display portion 370 are displayed on the second display area R2. The fuel consumption display portion 340 and the navigation display portion 370 are information other than the predetermined information D1 including the vehicle speed display portion 300, the shift position display portion 310, the fuel remaining amount display portion 320 and the direction indication display portion 330.

In other words, the second display mode M2 refers to a display mode where the vehicle state information including the vehicle speed display portion 300, the shift position display portion 310, the fuel remaining amount display portion 320, the direction indication display portion 330 and the fuel consumption display portion 340, and the external information of the vehicle including the navigation display portion 370 are displayed on the first display part 204.

In the second display mode M2, the outside temperature display portion 350 and the alert display portion 360, which are displayed on the second display area R2 in the first display mode M1, are in a non-display state. The fuel consumption display portion 340 is in a state where the digital display value and unit display of fuel consumption are moved directly below the display referring to "average fuel consumption" and the left region 400 described above is reduced. Hereinafter, the reduced left region 400 of the second display area R2 in the second display mode M2 will be described as a left area 500.

Further, in the region of the second display area R2 other than the left area 500, a right area 510 is located on the right side of the left area 500. The navigation display portion 370 including a turn-by-turn display is displayed on the right area 510. The turn-by-turn display includes an arrow display 371, an intersection name display 372 and a remaining distance display 373 for indicating a remaining distance to intersection, as shown in FIG. 5(a). Meanwhile, the navigation display portion 370 may employ a map display, instead of the turn-by-turn display.

That is, the above-described right region 410 formed on the second display area R2 in the execution of the first display mode M1 is provided as the right area 510 in the execution of the second display mode M2. Here, the right area 510 is larger than the right region 410. The navigation display portion 370 is displayed on the right area 510.

Thus, in the case of this, the second display area R2 is configured as a variable display area where the display format of the other information D2 (e.g., the fuel consumption display portion 340 or the navigation display portion 370) can be varied in conjunction with displaying of the navigation display portion 370 that is the external information of the vehicle in the execution of the second display mode M2.

Next, a display layout of the first display part 204 when the first control means 202 receives the alert signal during the execution of the second display mode M2 shown in FIG. 5(a) will be described with reference to FIG. 5(b).

FIG. 5(b) shows a modified example of the second display mode M2 where the above-described alert display portion 360 is displayed so as to interrupt a portion (at least a portion) of the navigation display portion 370. In this case, the first control means 202 has a function of determining whether or not the alert signal (caution evocating information) is generated in the execution of the second display mode M2. When it is determined that the alert signal (caution evocating information) is generated, the first control means 202 implements a control for displaying and operating the first display part 204 in such a way that a portion of the navigation display portion 370 displayed on the right side of the second display area R2 is switched and displayed as the alert display portion 360 (the caution evocating information).

Then, for example, as shown in FIG. 5(b), the arrow display 371 and the intersection name display 372, which are previously displayed on the second display area R2 of the first display part 204, are in a non-display state. Further, the alert display portion 360 referring to "trunk is opened" is displayed to interrupt a site where the arrow display 371 and the intersection name display 372 are previously displayed. Thereafter, upon receiving a trunk closing signal indicating that the trunk is closed, the first control means 202 implements a control for displaying and operating the first display part 204 in such a way that the first display part 204 returns to the display layout shown in FIG. 5(a) (i.e., the alert display portion 360 is in a non-display state and the arrow display 371 and the intersection name display 372 are re-displayed), on the basis of the trunk closing signal.

As described above, according to the present embodiment, the first display part 204 includes the first display area R1 for displaying the predetermined information D1 of the vehicle state information and the second display area R2 for displaying the other information D2 of the vehicle state information different from the predetermined information D1. The first control means 202 implements the first display mode M1 where the vehicle state information is displayed on the first display part 204 and the second display mode M2 where the vehicle state information and the navigation display portion (external information of a vehicle) 370 are displayed on the first display part 204. Further, the first control means 202 activates the first display part 204 so that the navigation display portion 370 is displayed on the second display area R2 in the second display mode M2. Further, the first display area R1 is configured as a fixed display area where the predetermined information D1 can be displayed on a predetermined display position in the execution of the first and second display modes M1, M2. The second display area R2 is configured as a variable display area where the display format of the other information D2 (the fuel consumption display portion 340 or the navigation display portion 370) can be varied in conjunction with displaying of the navigation display portion 370 in the execution of the second display mode M2.

Accordingly, in the case of providing the external information (of the vehicle) held in the external device 103 to the vehicle user through the first display part 204 included in the vehicle-mounted device 102, the displayed position (display layout) of the predetermined information D1 including the vehicle speed display portion 300, the shift position display portion 310, the fuel remaining amount display portion 320 and the direction indication display portion 330, which are displayed on the first display area R1 of the first display part 204, is unchangeable, regardless of the switching of the display modes M1, M2. Therefore, the movement of information displayed on the first display part 204 is suppressed to a necessary minimum amount, so that it is possible to provide an information providing device for a vehicle having an improved human/machine interface.

Further, in the case of the present embodiment, the vehicle state information includes the alert display portion 360 as the caution evocating information for calling the attention of a vehicle user. The first control means 202 has a function of determining whether or not the alert signal (caution evocating information) is generated in the execution of the second display mode M2. When it is determined that the alert signal (caution evocating information) is generated, the first control means 202 implements operating the first display part 204 in such a way that the arrow display 371 and the intersection name display 372 (i.e., a part of the navigation display portion 370), which are displayed on the second display area R2, are switched and displayed as the alert display portion 360 that is the caution evocating information. Thereby, it is possible to optimize the display layout of the first display part 204 in accordance with various vehicle states while suppressing, to a necessary minimum amount, the movement of information displayed on the first display part 204.

Second Embodiment

Figure 6:
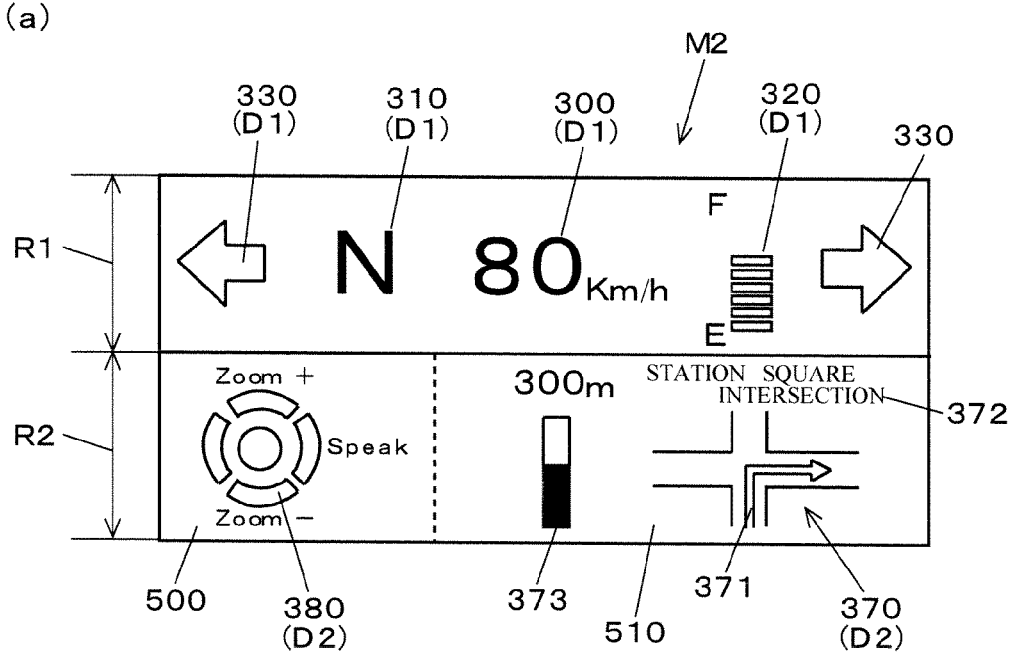
FIG. 6(a) is a view showing a display layout of the display part in the second display mode according to a second embodiment of the present invention and FIG. 6(b) is a view showing a display layout of the display part in the second display mode according to the second embodiment of the present invention when the first control means receives the caution evocating information.
Figure 6:
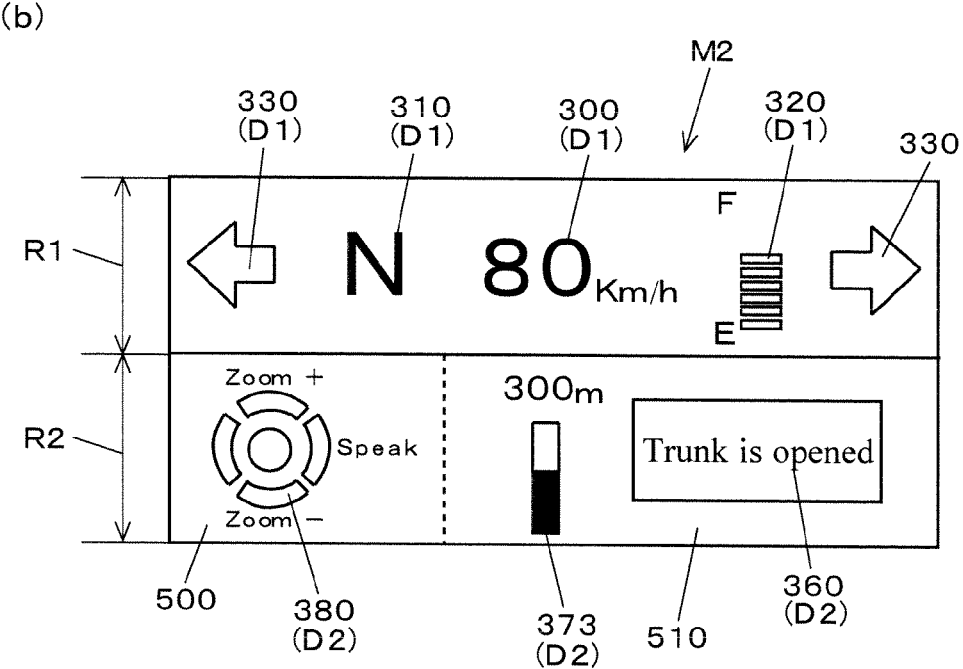

Next, a second embodiment of the present invention will be described with reference to FIG. 6. Here, the same or similar element will be denoted by the same reference numeral as that of the first embodiment and a detailed explanation thereof will be omitted. The second embodiment is different from the first embodiment in that the fuel consumption display portion 340 displayed on the left of the second display area R2 in the second display mode M2 is in a non-display state and an operation display portion 380 is displayed in place of the fuel consumption display portion 340, as shown in FIG. 6(*a*).

In the case of the second embodiment, the first control means 202 implements a control for displaying and operating the first display part 204 in such a way that the external information of the vehicle including operation information (the operation display portion 380) about an operation of the external device 103 and the navigation display portion 370 is displayed on the second display area R2 in the execution of the second display mode M2.

Meanwhile, in the second embodiment, the predetermined information D1 displayed on the first display area R1 includes the vehicle speed display portion 300, the shift position display portion 310, the fuel remaining amount display portion 320 and the direction indication display portion 330, similar to the case of the first embodiment.

The operation display portion 380 is adapted to display the operation information of the external device 103 corresponding to the navigation display portion 370 which is displayed so as to be adjacent to the right side thereof. Further, an outer shape and an operable operation function of the operation means 213 are displayed on the operation display portion 380. Here, as the operation function, "Zoom +" corresponding to the enlargement of the map display, "Zoom −" corresponding to the reduction of the map display and "Speak" corresponding to the implementation of a voice guide of a route guidance are illustrated.

According to the second embodiment, the displayed position (display layout) of the predetermined information D1 displayed on the first display area R1 of the first display part 204 is unchangeable, regardless of the switching of the display modes M1, M2. Therefore, the movement of information displayed on the first display part 204 is suppressed to a necessary minimum amount, so that it is possible to obtain the same operational effects as the first embodiment. Further, since the navigation display portion 370 and the operation display portion 380 are displayed on the second display area R2 in the second display mode M2, there is an advantage that the operation content and button position (operation position) of the operation means 213 can be simply presented to the vehicle user. Here, the operation means 213 is a substantially cross key type operation input unit.

Meanwhile, upon receiving the alert information in the second display mode M2 shown in FIG. 6(*a*), the first control means 202 implements a control for displaying and operating the first display part 204 in such a way that at least a portion (e.g., the arrow display 371 and the intersection name display 372) of the navigation display portion 370 is switched and displayed as the alert display portion 360 (other information D2) referring to "trunk is opened", as shown in FIG. 6(*b*). In this regard, the same processing as the display switching from the display layout shown in FIG. 5(*a*) to the display layout shown in FIG. 5(*b*) in the first embodiment is performed.

Further, in the first and second embodiments, an example has been described where the first display part 204 is divided into two display areas (the first and second display areas R1, R2). However, for example, the first display part 204 may be divided into three or more display areas.

Figure 7:
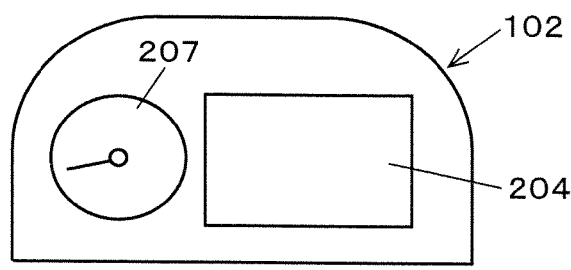
FIG. 7 is a schematic view showing an example of a vehicle-mounted device according to a modified example of the first and second embodiments of the present invention.

Further, in the first and second embodiments, an example has been described where the vehicle-mounted device 102 that is a vehicle instrument includes a single first display part 204. However, for example, as shown in FIG. 7, the vehicle-mounted device 102 may be configured by the first display part 204 and the tachometer that is one of various analog-type instruments 207. Alternatively, the vehicle-mounted device 102 may be configured by the first display part 204 and the speedometer that is one of various analog-type instruments 207.

In the case where the vehicle-mounted device 102 is configured by the first display part 204 and the speedometer, the vehicle speed display portion 300 displayed on the first display part 204 may be in a non-display state. When the vehicle speed display portion 300 is in a non-display state, the predetermined information D1 includes the shift position display portion 310, the fuel remaining amount display portion 320, the direction indication display portion 330 and the speedometer. That is, the vehicle speed display portion 300 can be substituted with the analog-type instruments 207 (i.e., the speedometer). In this case, a display area including the predetermined information D1 and the analog-type instruments 207 (i.e., the speedometer) corresponds to the first display area R1.

Third Embodiment

Next, a third embodiment of the present invention will be described with reference to FIG. 8 and FIG. 9. Here, the same or similar element will be denoted by the same reference numeral as that of the first and second embodiments and a detailed explanation thereof will be omitted. In the third embodiment, the first control means 202 implements a process of switching the display information displayed on the first display part 204 from the first display mode M1 to the second display mode M2 when receiving an operation instruction signal outputted from the operation means 213 that can be operated by a vehicle user. In the execution of the second display mode M2, the first display part 204 is provided with a vehicle information display area R3 for displaying predetermined information (to be described later) of the vehicle state information and an external information display area R4 for displaying the external information of the vehicle, as shown in FIG. 9(a).

Figure 8:
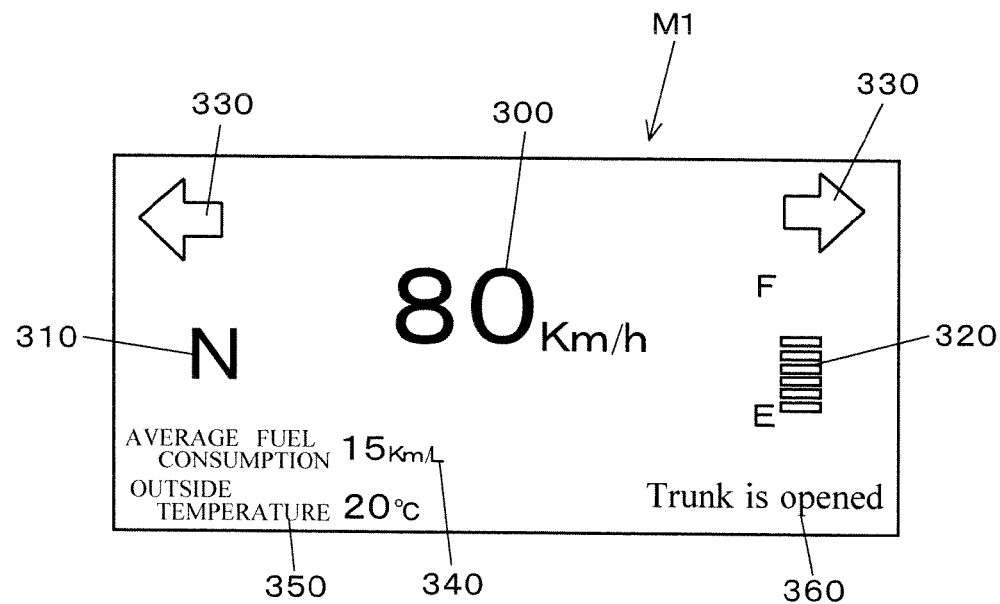
FIG. 8 is a view showing a display layout of the display part in the first display mode according to a third embodiment of the present invention.
Figure 9:
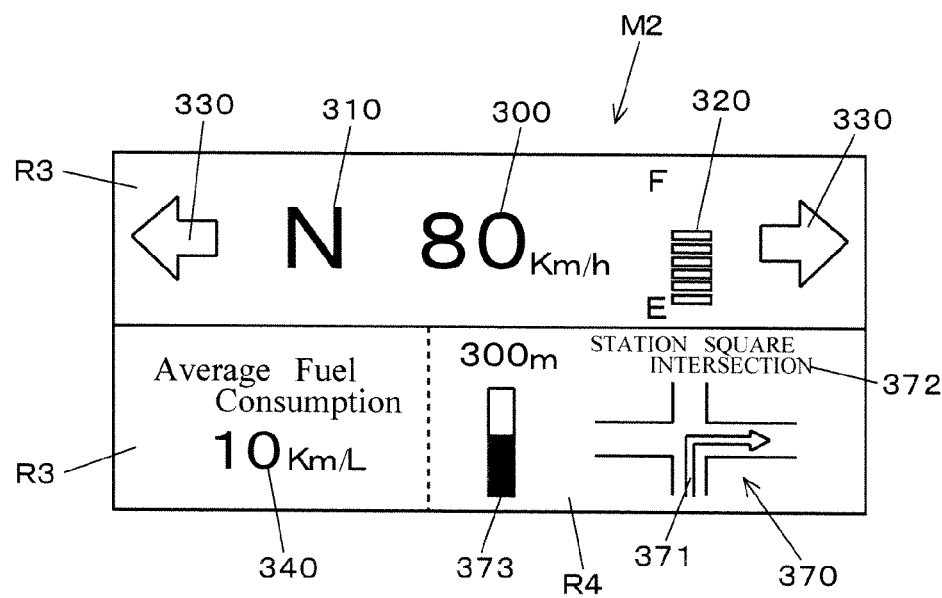
FIG. 9(a) is a view showing a display layout of the display part in the second display mode according to the third embodiment of the present invention and FIG. 9(b) is a view showing a display layout of the display part in the second display mode according to the third embodiment of the present invention when the first control means receives the caution evocating information.
Figure 9:
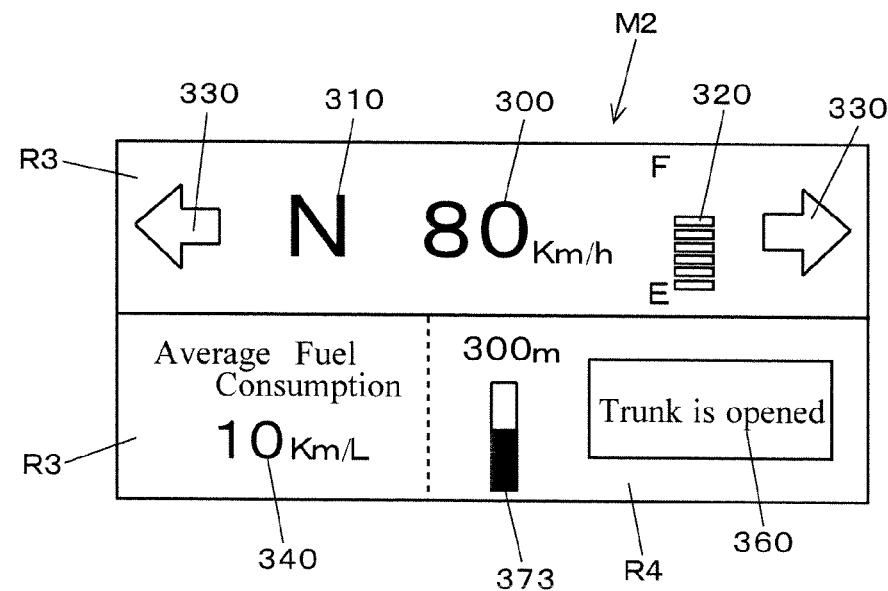

FIG. 8 shows another display layout relating to the vehicle state information displayed on the first display part 204 when the first control means 202 included in the vehicle-mounted device 102 implements the first display mode M1 in the third embodiment.

Figure 4:
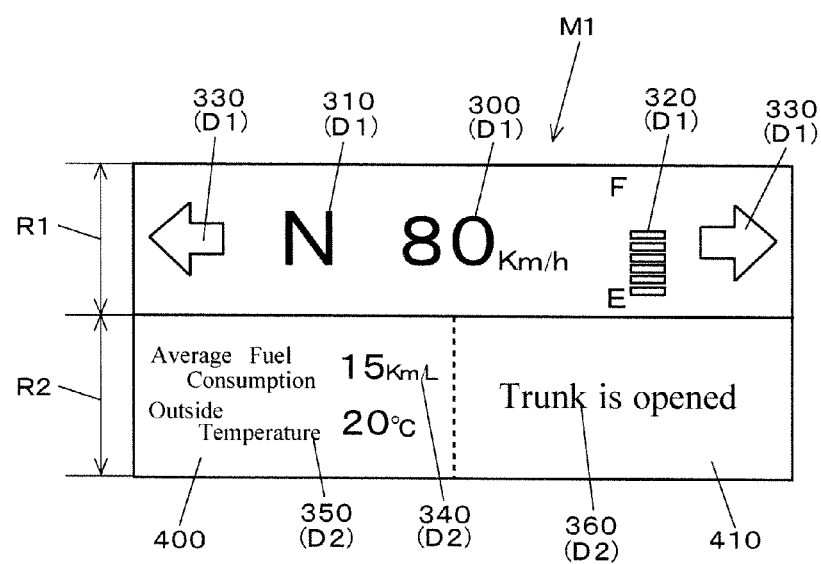
FIG. 4 is a view showing a display layout of a display part in a first display mode according to the above embodiment.
Figure 5:
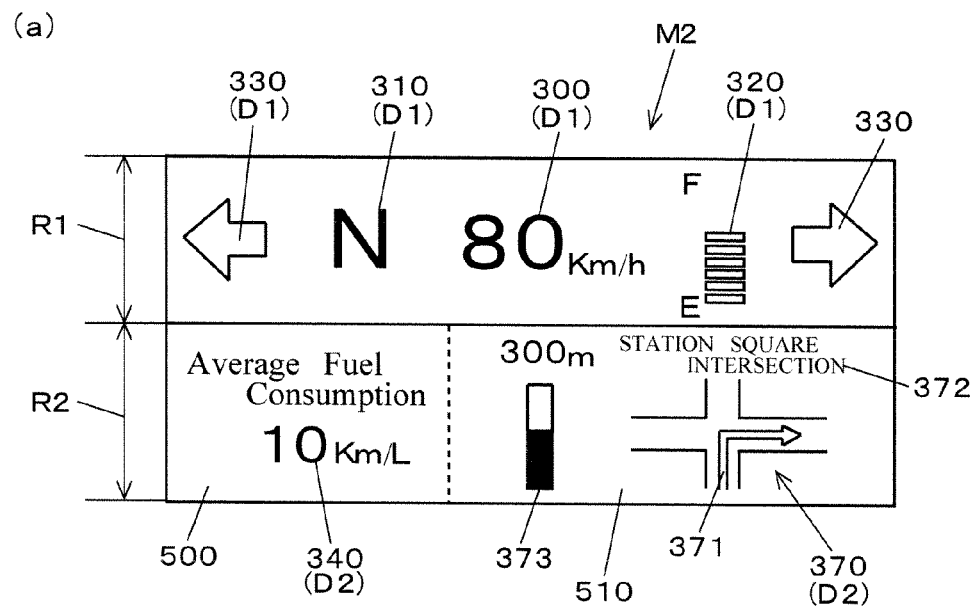
FIG. 5(a) is a view showing a display layout of the display part in a second display mode according to the above embodiment and FIG. 5(b) is a view showing a display layout of the display part in the second display mode according to the above embodiment when a first control means receives caution evocating information.
Figure 5:
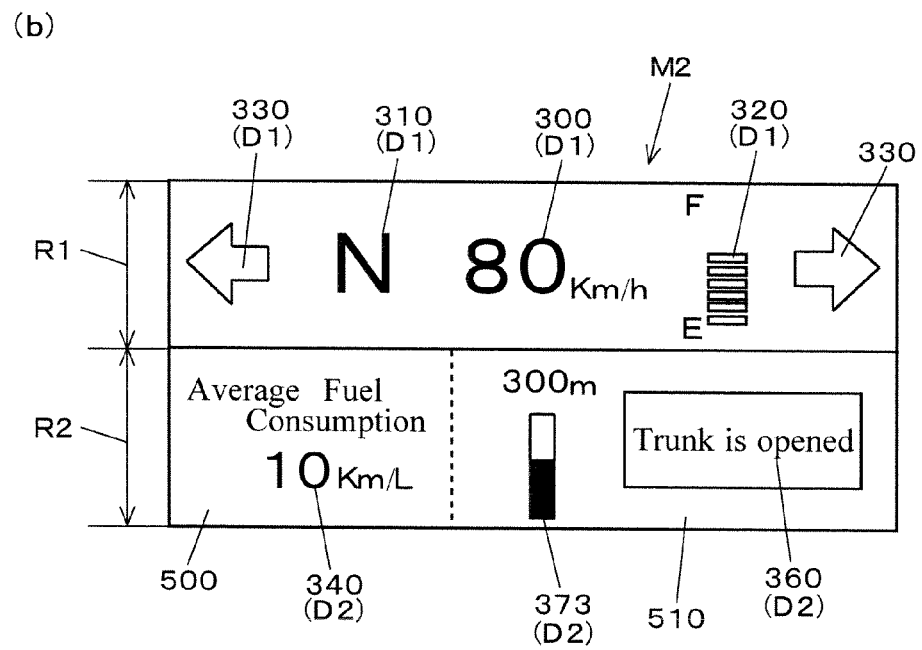

Here, another display layout shown in FIG. 8 has a configuration different from the display layout employed in the first embodiment (FIG. 4). However, in both of the display layouts, the vehicle state information is displayed on the first display part 204. Accordingly, both of the display layouts are defined as the display layout in the execution of the first display mode M1.

For example, in the first display mode M1 displayed on the first display part 204 shown in FIG. 8, the vehicle speed display portion 300 is displayed substantially on the center region of the first display part 204, the shift position display portion 310 is displayed on the center of the left end portion of the first display part 204, the fuel remaining amount display portion 320 is displayed on the center of the right end portion of the first display part 204, the direction indication display portion 330 is displayed on the upper right corner and upper left corner of the first display part 204, the fuel consumption display portion 340 and the outside temperature display portion 350 are displayed on the lower left corner of the first display part 204, and the alert display portion 360 is displayed on the lower right corner of the first display part 204. Meanwhile, in the first display mode M1 shown in FIG. 8, each of the vehicle state information including the vehicle speed display portion 300 can be located in an arbitrary layout.

Further, the first control means 202 receives the vehicle state signal through the multiplex communication input/output terminal 211 (or the vehicle information terminal 210) and determines whether or not the vehicle is stopped. When it is determined that the vehicle is stopped (when receiving a signal indicating that a vehicle speed is 0 km per hour), the first control means 202 implements a process of switching the display information corresponding to the first display mode M1 shown in FIG. 8 and previously displayed on the first display part 204 to the display information corresponding to the second display mode M2 as shown in FIG. 9(a), on the basis of the input of the operation instruction signal.

In the execution of the second display mode M2, the first control means 202 receives the vehicle state signal through the multiplex communication input/output terminal 211 (or the vehicle information terminal 210). Simultaneously, the first control means 202 receives the external information of the vehicle (herein, navigation information) from the external device 103. Based on the vehicle state signal or the navigation information, the first control means 202 implements a control for displaying and operating the first display part 204 in such a way that the display information corresponding to the second display mode M2 as shown in FIG. 9(a) is displayed on the first display part 204.

Accordingly, similar to the case of FIG. 5(a) described in the first embodiment, the display information corresponding to the second display mode M2 includes the vehicle speed display portion 300, the shift position display portion 310, the fuel remaining amount display portion 320, the direction indication display portion 330, the fuel consumption display portion 340 and the navigation display portion 370.

Further, the predetermined information (in this case, the vehicle speed display portion 300, the shift position display portion 310, the fuel remaining amount display portion 320, the direction indication display portion 330, and the fuel consumption display portion 340) of the vehicle state information is displayed on the vehicle information display area R3 configured by the upper half area and the lower left half area in FIG. 9(a). The external information of the vehicle (the navigation display portion 370) other than the predetermined information is displayed on the external information display area R4 configured by the lower right half area in FIG. 9(a).

The navigation display portion 370 is configured by the turn-by-turn display and includes the arrow display 371, the intersection name display 372 and the remaining distance display 373 for indicating a remaining distance to intersection. Further, the vehicle speed display portion 300, the shift position display portion 310, the fuel remaining amount display portion 320, the direction indication display portion 330, and the fuel consumption display portion 340, which are displayed on the vehicle information display area R3, can be located at the vehicle information display area R3 in an arbitrary layout. Meanwhile, in the second display mode M2 shown in FIG. 9(a), the outside temperature display portion 350 and the alert display portion 360, which are displayed in the first display mode M1 shown in FIG. 8, are in a non-display state.

According to the third embodiment, the first control means 202 implements a process of switching the display information displayed on the first display part 204 from the first display mode M1 (where each of the vehicle state information is located in an arbitrary layout) to the second display mode M2 when receiving the operation instruction signal outputted from the operation means 213 during the stop of the vehicle. When the second display mode M2 is implemented, the vehicle speed display portion 300, the shift position display portion 310, the fuel remaining amount display portion 320, the direction indication display portion 330 and the fuel consumption display portion 340 (predetermined information of the vehicle state information) are displayed on the vehicle information display area R3 that is the upper half area and the lower left half area of the first display part 204. Further, the navigation display portion 370 (the external information of the vehicle) is displayed on the external information display area R4 that is the lower right half area of the first display part 204.

Therefore, the lower right half area where any vehicle state information is previously displayed in a layout becomes the external information display area R4 after the change of the mode and the external information of the vehicle (navigation display portion 370) is displayed on the external information display area R4. In this way, it is possible to change the layout of various information to be displayed on the first display part 204 as an instrument display in accordance with an operation of a user using the operation means 213 when the user has time to spare. As a result, it is possible to provide an information providing device for a vehicle having an improved human/machine interface.

Next, a display layout of the first display part 204 when the first control means 202 receives the alert signal during the execution of the second display mode M2 shown in FIG. 9(*a*) will be described with reference to FIG. 9(*b*).

FIG. 9(*b*) shows a modified example of the second display mode M2 where the above-described alert display portion 360 is displayed so as to interrupt a portion (at least a portion) of the navigation display portion 370. In this case, when it is determined that the alert signal (caution evocating information) is generated in the execution of the second display mode M2, the first control means 202 implements a control for displaying and operating the first display part 204 in such a way that a portion of the navigation display portion 370 displayed on the external information display area R4 is switched and displayed as the alert display portion 360 (the caution evocating information).

Then, for example, as shown in FIG. 9(*b*), the arrow display 371 and the intersection name display 372, which are previously displayed on the external information display area R4 of the first display part 204, are in a non-display state. Further, the alert display portion 360 referring to "trunk is opened" is displayed to interrupt a site where the arrow display 371 and the intersection name display 372 are previously displayed. Accordingly, even when the caution evocating information for calling the attention of a vehicle user is generated, it is possible to optimize the display layout of the first display part 204 while suppressing, to a necessary minimum amount, the movement of information displayed on the first display part 204.

Fourth Embodiment

Next, a fourth embodiment of the present invention will be described with reference to FIG. 10. Here, the same or similar element will be denoted by the same reference numeral as that of the first to third embodiments and a detailed explanation thereof will be omitted. In the fourth embodiment, the configuration of the third embodiment is used as a basic configuration. The first control means 202 implements a process of switching the display information displayed on the first display part 204 from the first display mode M1 shown in FIG. 8 to a third display mode M3 when receiving the operation instruction signal outputted from the operation means 213 that can be operated by a vehicle user. In the execution of the third display mode M3, the first display part 204 is provided with the vehicle information display area R3 for displaying predetermined information (to be described later) of the vehicle state information, the external information display area R4 for displaying the external information of the vehicle and an operation information display area R5 for displaying the operation information relating to an operation of the external device 103, as shown in FIG. 10(*a*).

In the case of the fourth embodiment, in the execution of the third display mode M3, the first control means 202 causes the fuel consumption display portion 340 to be in a non-display state, which is displayed on the vehicle information display area R3 employed in the second display mode shown in FIG. 9(*a*). Further, the first control means 202 causes the operation display portion 380 that is operation information relating to an operation of the external device 103 to be displayed in place of the fuel consumption display portion 340.

Figure 10:
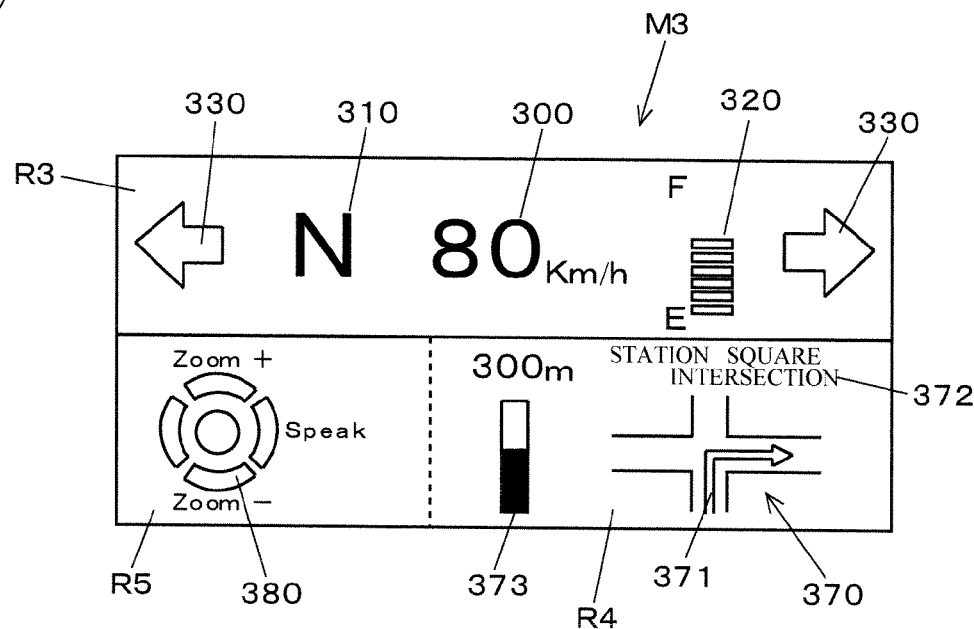
FIG. 10(a) is a view showing a display layout of the display part in a third display mode according to a modified example of the third embodiment of the present invention and FIG. 10(b) is a view showing a display layout of the display part in the third display mode according to the modified example of the third embodiment of the present invention when the first control means receives the caution evocating information.
Figure 10:
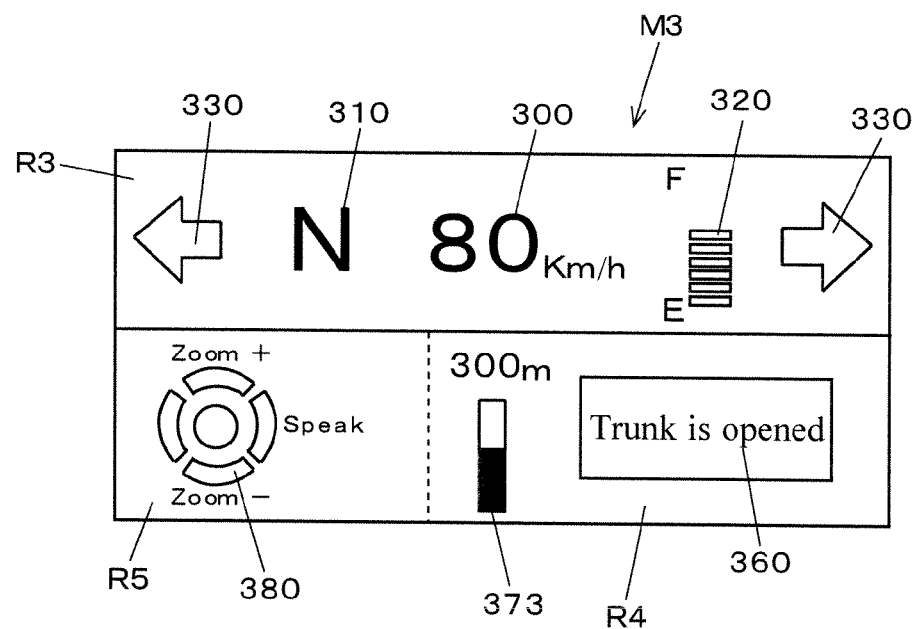

Here, a display state of the first display part 204 where the operation display portion 380 rather than the fuel consumption display portion 340 shown in FIG. 10(*a*) is displayed is defined as the third display mode M3 for convenience sake. Hereinafter, the third display mode M3 will be described. Meanwhile, the operation information display area R5 is the lower left half area of the first display part 204 in FIG. 10(*a*). The configuration of the operation display portion 380 displayed on the operation information display area R5 is the same as that of the second embodiment described above.

According to the fourth embodiment, the predetermined information (i.e., the vehicle speed display portion 300, the shift position display portion 310, the fuel remaining amount display portion 320 and the direction indication display portion 330) of the vehicle state information is displayed on the vehicle information display area R3 located at an upper side of the first display part 204. The operation display portion 380 is displayed on the operation information display area R5 located at a lower left half area of the first display part 204. The navigation display portion 370 is displayed on the external information display area R4 located at a lower right half area of the first display part 204.

Therefore, the lower right half area where any vehicle state information is previously displayed in a layout becomes the external information display area R4 after the change of the mode and the external information of the vehicle (navigation display portion 370) is displayed on the external information display area R4. In this way, it is possible to change the layout of various information to be displayed on the first display part 204 as an instrument display in accordance with an operation of a user using the operation means 213 when the user has time to spare. As a result, it is possible to provide an information providing device for a vehicle having an improved human/machine interface.

Further, since the operation display portion 380 is displayed on the operation information display area R5 so as to be adjacent to the navigation display portion 370 in the third display mode M3, there is an advantage that the operation content and button position (operation position) of the operation means 213 can be simply presented to the vehicle user. Here, the operation means 213 is a substantially cross key type operation input unit.

Meanwhile, in the execution of the third display mode M3 shown in FIG. 10(*a*), the first control means 202 has a function of determining whether or not the alert signal (caution evocating information) is generated. When it is determined that the alert signal (caution evocating information) is generated, the first control means 202 implements a control for displaying and operating the first display part 204 in such a way that a part of the navigation display portion 370 (the external information of the vehicle), which is displayed on the external information display area R4, is switched and displayed as the alert display portion 360 (caution evocating information).

Accordingly, even when the caution evocating information for calling the attention of a vehicle user is generated, it is possible to optimize the display layout of the first display part 204 while suppressing, to a necessary minimum amount, the movement of information displayed on the first display part 204.

Further, in the fourth embodiment, the first control means 202 implements a control for displaying and operating the first display part 204 in such a way that a part of the navigation display portion 370 is switched and displayed as the alert display portion 360. However, for example, the first control means 202 may implement a control for displaying and operating the first display part 204 in such a way that at least a portion of the operation display portion 380 displayed on the operation information display area R5 is switched and displayed as the alert display portion 360.

Meanwhile, in the case of the third and fourth embodiments, upon receiving the operation instruction signal outputted from the operation means 213 that can be operated by a vehicle user, the first control means 202 implements a process of switching the first display mode M1 where the vehicle state information is displayed on the first display part 204 to the second display mode M2 where the vehicle state information and the external information of the vehicle are displayed on the first display part 204, or implements a process of switching the first display mode M1 to the third display mode M3 where the vehicle state information, the external information of the vehicle and the operation information relating to the operation of the external device 103 are displayed on the first display part 204. However, for example, upon receiving a signal indicating that the external device 103 is connected to the vehicle-mounted device 102, the first control means 202 may implement a process of switching the display information displayed on the first display part 204 from the first display mode M1 to the second display mode M2 (or the third display mode M3).

INDUSTRIAL APPLICABILITY

The present invention relates to the information providing device for the vehicle, using the vehicle-mounted device and the external device. As the vehicle-mounted device, not only a vehicle meter (vehicle instrument) for displaying the vehicle information, but also the navigation device or multi-display device or the like, which are mounted to the vehicle, may be employed.

REFERENCE SIGNS LIST

101 Information Providing Device for Vehicle
102 Vehicle-mounted device
103 External device
104 Connection Means
202 First Control Means
204 First Display part (Display part)
207 Various Analog Instruments
209 First Communication Unit
213 Operation Means
252 Second Control Means
260 Second Communication Unit
300 Vehicle Speed Display portion
310 Shift Position Display portion
320 Fuel Remaining Amount Display portion
330 Direction Indication Display portion
340 Fuel Consumption Display portion
350 Outside Temperature Display portion
360 Alert Display portion
370 Navigation Display portion (External Information of Vehicle)
371 Arrow Display
372 Intersection Name Display
373 Remaining Distance Display
380 Operation Display Portion (Operation Information)
D1 Predetermined Information
D2 Other Information
M1 First Display Mode
M2 Second Display Mode
M3 Third Display Mode
R1 First Display Area
R2 Second Display Area
R3 Vehicle Information Display Area
R4 External Information Display Area
R5 Operation Information Display Area

The invention claimed is:

1. An information providing device for a vehicle comprising:
a vehicle-mounted device comprising:
a display including a first display area and a second display area; and
a first microcomputer programmed to control the display to display vehicle state information to a user; and
an external device, connected to the vehicle-mounted device, comprising a second microcomputer programmed to output external information of the vehicle to the vehicle-mounted device,
wherein the first microcomputer is further programmed to implement:
a first display mode where the vehicle state information is displayed on the display; and
a second display mode where predetermined information of the vehicle state information is displayed on the first display area of the display, and the external information of the vehicle and external information operation portion are displayed on the second display area, the external information operation portion enabling the user to operate the external device via the second display area.

2. The information providing device for a vehicle according to claim 1, wherein the first display area is configured as a fixed display area where the predetermined information can be displayed on a predetermined display position in the first and second display modes, and
wherein the second display area is configured as a variable display area where other information of the vehicle state information different from the predetermined information can be displayed in conjunction with displaying of the external information of the vehicle in the second display mode, a first display format of the other information being able to vary based on a second display format of the external information of the vehicle.

3. The information providing device for a vehicle according to claim 1, wherein the vehicle state information includes caution evocating information for calling the attention of the user, and
wherein the first microcomputer is further programmed to implement a function of determining whether or not the caution evocating information is generated in the second display mode, and
when it is determined that the caution evocating information is generated, the first microcomputer controls the display so that a portion of the external information of a vehicle displayed on the second display area is switched to display the caution evocating information.

4. An information providing device for a vehicle comprising:
a vehicle-mounted device comprising:
a display including a first display area and a second display area; and
a first microcomputer programmed to control the display to display vehicle state information to a user; and
an external device connected to the vehicle-mounted device, comprising a second microcomputer programmed to output external information of the vehicle to the vehicle-mounted device, wherein the first microcomputer is further programmed to implement a process of switching from a first display mode to a second display mode when receiving a signal indicating that the external device is connected to the vehicle-mounted device or a user operation instruction signal, wherein, in the first display mode, the vehicle state information is displayed on the display, and wherein, in the second display mode, predetermined information of the vehicle state information is displayed on the first display area, and the external information and external information operation portion are displayed in the second display area, the external information operation portion enabling the user to operate the external device via the second display area.

5. The information providing device for a vehicle according to claim 4, wherein the vehicle state information includes caution evocating information for calling the attention of the user, and wherein the first microcomputer is further programmed to implement a function of determining whether or not the caution evocating information is generated in the second display mode, and when it is determined that the caution evocating information is generated, the first microcomputer controls the display so that a portion of the external information of a vehicle on the external information display area is switched to display the caution evocating information.

6. The information providing device for a vehicle according to claim 4, wherein the first display area is configured as a fixed display area where the predetermined information can be displayed on a predetermined display position in the execution of the first and second display modes, and wherein the second display area is configured as a variable display area where other information of the vehicle state information different from the predetermined information can be displayed in conjunction with displaying of the external information of the vehicle in the second display mode, a first display format of the other information being able to vary based on a second display format of the external information of the vehicle.

7. An information providing device for a vehicle comprising:

a vehicle-mounted device comprising:
a display including a first display area and a second display area; and
a first microcomputer programmed to control the display to display vehicle state information to a user; and an external device, connected to the vehicle-mounted device, comprising a second microcomputer programmed to output external information of the vehicle to the vehicle-mounted device, wherein the first microcomputer is further programmed to implement a process of switching from a first display mode to a second display mode when determining that the vehicle stops and when receiving a signal indicating that the external device is connected to the vehicle-mounted device or a user operation instruction signal, wherein, in the first display mode, the vehicle state information is displayed in an arbitrary layout on the display, and wherein, in the second display mode, predetermined information of the vehicle state information is displayed in the first display area, and the external information and external information operation portion are displayed in the second display area, the external information operation portion enabling the user to operate the external device via the second display area.

8. The information providing device for a vehicle according to claim 7, wherein the vehicle state information includes caution evocating information for calling the attention of the user, and wherein the first microcomputer is further programmed to implement a function of determining whether or not the caution evocating information is generated in the second display mode, and when it is determined that the caution evocating information is generated, the first microcomputer controls the display so that a portion of the external information of a vehicle on the second display area is switched to display the caution evocating information.

* * * * *